(12) United States Patent
Ganster et al.

(10) Patent No.: US 7,498,380 B2
(45) Date of Patent: Mar. 3, 2009

(54) ADHESIVES

(75) Inventors: Otto Ganster, Odenthal (DE); Jörg Büchner, Bergisch Gladbach (DE); Heinz-Werner Lucas, Bergisch Gladbach (DE); Wolfgang Henning, Kürten (DE)

(73) Assignee: Bayer MaterialScience AG, Leverkusen (DE)

( * ) Notice: Subject to any disclaimer, the term of this patent is extended or adjusted under 35 U.S.C. 154(b) by 308 days.

(21) Appl. No.: 11/137,260

(22) Filed: May 25, 2005

(65) Prior Publication Data

US 2005/0267255 A1 Dec. 1, 2005

(30) Foreign Application Priority Data

May 28, 2004 (DE) .................. 10 2004 026 118

(51) Int. Cl.
C08G 18/08 (2006.01)
C08K 3/00 (2006.01)
C08K 3/20 (2006.01)

(52) U.S. Cl. ..................... 524/589; 524/591

(58) Field of Classification Search .................. 524/589, 524/591
See application file for complete search history.

(56) References Cited

U.S. PATENT DOCUMENTS

| | | | | |
|---|---|---|---|---|
| 3,479,310 | A | 11/1969 | Dieterich et al. | 260/29.2 |
| 4,092,286 | A | 5/1978 | Noll et al. | 260/29.2 TN |
| 4,190,566 | A | 2/1980 | Noll et al. | 260/29.2 TN |
| 4,192,937 | A | 3/1980 | Noll et al. | 528/59 |
| 4,238,378 | A | 12/1980 | Markusch et al. | 260/29.2 TN |
| 4,269,748 | A | 5/1981 | Nachtkamp et al. | 260/29.2 TN |
| 4,888,124 | A | 12/1989 | Blum et al. | 252/182.2 |
| 5,159,011 | A | 10/1992 | Rau et al. | 524/562 |
| 6,348,548 | B1 | 2/2002 | Abend | 525/452 |
| 6,593,435 | B2 | 7/2003 | Abend | 525/452 |
| 2002/0193534 | A1 | 12/2002 | Abend | 525/452 |
| 2003/0119976 | A1 | 6/2003 | Ganster et al. | 524/589 |
| 2003/0153713 | A1* | 8/2003 | Spyrou et al. | 528/48 |
| 2003/0232199 | A1* | 12/2003 | Rische et al. | 428/423.1 |
| 2004/0162387 | A1* | 8/2004 | Rische et al. | 524/839 |
| 2005/0159575 | A1* | 7/2005 | Rische et al. | 528/44 |

FOREIGN PATENT DOCUMENTS

CA 2 355 908 A1 6/2001

OTHER PUBLICATIONS

Methoden der Organischen Chemie [Organic Chemistry Methods] Houben Weyl, vol. E 20, Chapter 14, (month unavailable) 1987, pp. 1739-1751, D. Dieterich, "Cyclische Poly(harnstoffe)".

* cited by examiner

*Primary Examiner*—Mark Eashoo
*Assistant Examiner*—Noah Frank
(74) *Attorney, Agent, or Firm*—Connolly Bove Lodge & Hutz LLP

(57) ABSTRACT

Preparations of surface-deactivated solid isocyanates which are dispersed in finely particulate manner, with aqueous isocyanate-reactive polymer dispersions that include
  a) dispersed polymers having isocyanate-reactive groups,
  b) dispersed surface-deactivated oligomeric solid polyisocyanates, and
  c) at least one catalyst,
where the catalyst or the totality of catalysts accelerates the reaction of the monomeric polyisocyanates which form by the thermal cleavage of the oligomeric polyisocyanates more strongly than the thermal cleavage itself. The preparations are prepared by mixing aqueous dispersions of at least one isocyanate-reactive polymer with at least one dispersed surface-deactivated oligomreric solid polyisocyanate and at least one catalyst. The preparations can be used in binders, films and powders for bonded joints, or coatings and to make a latently cross-linking adhesive layer. Substrates can be coated with layers obtainable with the above-described preparations.

19 Claims, No Drawings

ADHESIVES

CROSS REFERENCE TO RELATED PATENT APPLICATION

The present patent application claims the right of priority under 35 U.S.C. § 119 (a)-(d) of German Patent Application No. 10 2004 026 118, filed May 28, 2004.

BACKGROUND OF THE INVENTION

1. Field of the Invention

The present invention provides aqueous preparations of isocyanate-reactive polymer dispersions having surface-deactivated oligomeric solid isocyanates dispersed in finely particulate manner and certain catalysts. The invention likewise provides the use of the preparations as latently reactive binders, for coatings as well as for adhesives in the form of layers, films or powders, as well as substrates which are coated therewith.

2. Description of the Prior Art

Aqueous preparations of isocyanate-reactive polymer dispersions having surface-deactivated, uretdione group-containing oligomeric solid isocyanates dispersed in finely particulate manner, as well as the use thereof as latently reactive binders for coatings as well as for adhesives are known.

EP-A 0 204 970 describes a process for the production of stable dispersions of finely particulate polyisocyanates by treating the polyisocyanates in a liquid with stabilisers and with the action of high shear forces or grinding. Di- and polyisocyanates whereof the melting point is greater than 10° C., preferably greater than 40° C., are suitable for this purpose. The stabilisers utilised for generating the retarding or surface-deactivating polymer cover which surrounds the isocyanate particles are mono- or polyfunctional amine stabilisers having primary and/or secondary amine groups. The dispersions which are described are used as cross-linking agents.

According to EP-A 0 467 168, aqueous preparations of copolymer dispersions and finely particulate surface-deactivated polyisocyanate solid suspensions are recommended. They are used as coating compositions for woven and non-woven substrates. Compounds which convert the isocyanate groups located on the surface to urea or polyurea structures, such as, for example, water or primary as well as secondary amines, are described as deactivating agents. The coatings produced with these preparations, which are also designated one-component latently reactive layers, are cross-linked in heat simultaneously with drying.

EP-A 0 922 720 describes processes for the production and use of storage-stable latently reactive layers or powders of surface-deactivated solid polyisocyanates and dispersion polymers having functional groups. For this purpose aqueous dispersions are used which comprise a solid polyisocyanate, for example TDI dimer (2,4-diisocyanatotoluene dimerised by way of a uretdione group; Acima AG, Switzerland; TSE Industries, Clearwater, Fla., USA) which is deactivated at the surface, and a polymer which is reactive with isocyanate. The latently reactive layers or powders, which are storage-stable at room temperature, are cross-linked by heating above an activation temperature. The production of the polyisocyanate dispersion and the surface deactivation take place in accordance with EP-A 0 204 970. In order to control the surface deactivation and the cross-linking reaction the dispersions used may also comprise catalysts, preferably those which are stable to hydrolysis in the aqueous dispersion and which subsequently accelerate the heat-activated cross-linking reaction. Examples are organic compounds of tin, of iron, of lead, of cobalt, of bismuth, of antimony, of zinc. Alkylmercaptide compounds of dibutyltin are preferred on account of the greater stability of the catalyst to hydrolysis. Tertiary amines such as dimethylbenzylamine, diazabicycloundecene, as well as non-volatile polyurethane foam catalysts based on tertiary amines may also be used for specific purposes or in combination with metal catalysts.

EP-A 1 013 690 describes aqueous dispersions of isocyanate-reactive polymers and solid surface-deactivated polyisocyanates, with the polymers which are water-soluble or dispersed in water having a minimum film-forming temperature of <+5° C., a glass transition temperature of <−5° C. and a storage modulus at 10 Hertz and +10° C. of $10^7$. The cross-linking reaction proceeds spontaneously under standard conditions—without heat activation—after evaporation of the water. According to DE-A 10 140 206 the mono- or polyamines used for the deactivation may have ionic groups, for example carboxylate or sulfonate groups, as a molecular structure constituent.

Particularly suitable latently reactive layers are distinguished in that they soften or decrystallise by brief heating, of less than 60 seconds' duration, to temperatures above 40° C., preferably to a temperature of 60° C. to 110° C., and in this state can be bonded with a substrate within the meaning of a pressure-sensitive or contact bonding. Simultaneously, under these conditions the surface-deactivated oligomeric solid isocyanate is activated which cross-links the polymers having isocyanate-reactive groups, which are comprised in the adhesive layer, and binds these to the substrate in the event that this also has isocyanate-reactive groups. This cross-linking process may proceed spontaneously, or optionally over a period of several days.

Preparations produced in accordance with the prior art which comprise as latently reactive cross-linking agents uretdiones of monomeric isocyanates involve the danger that significant quantities of the volatile isocyanate monomers may be liberated during processing or also during use of the finished components at elevated temperature as a result of cleavage of the thermally labile uretdione structure. This risk arises above all when substrates which must by their nature be subjected to thermal stress are processed. These include, for example, thermoplastic decorative foils which are applied by the thermoforming method, with heating beyond their softening point, to profiled furniture faces coated with one-component latently reactive systems. Automotive interior fitting elements may also be exposed to very high temperatures when the vehicle heats up in the sun. The isocyanate monomers may then outgas and pollute the atmosphere in the vehicle.

The object of the present invention was therefore to provide adhesive systems with which latently reactive layers can be created in which no liberation of isocyanate group-containing monomers occurs either during joining of the substrates which are to be bonded or during use of the same at elevated temperature.

SUMMARY OF THE INVENTION

The present invention provides aqueous preparations that include
  a) dispersed polymers having isocyanate-reactive groups,
  b) dispersed surface-deactivated oligomeric solid polyisocyanates, and
  c) at least one catalyst, where the catalyst or the totality of catalysts accelerates the reaction of the monomeric polyisocyanates which form by the thermal cleavage of the oligomeric polyisocyanates more strongly than the thermal cleavage itself.

The present invention also provides a, process for producing the above-described preparations, which include mixing aqueous dispersions of at least one isocyanate-reactive polymer with at least one dispersed surface-deactivated oligomeric solid polyisocyanate and at least one catalyst which accelerates the reaction of the monomeric polyisocyanates which form by the thermal cleavage of the oligomeric polyisocyanates more strongly than the thermal cleavage itself.

The present invention also provides binders, bonded joints, or coatings that include the above-described preparations and one or more additives selected from wetting agents, emulsifiers, thickeners, protective colloids, stabilisers, antioxidants, fillers, coloured pigments, plasticisers, non-solvent liquids, and combinations thereof.

The present invention further provides a method of making a latently cross-linking adhesive layer by applying the above-described binders, bonded joints, or coatings to a substrate.

The present invention is also directed to substrates coated with layers obtainable with the above-described preparations.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

This object can be achieved according to the invention by the utilisation of certain catalysts in the preparations which comprise oligomeric solid isocyanates as latently reactive cross-linking agents. The organic metal compounds of tin, of lead, of cobalt, of bismuth or of antimony which are used, for example in EP-A 0 922 720, as catalysts are, however, unsuitable for utilisation according to the invention because they are known to accelerate hydrolytic decomposition of the polymer chain of the preferred dispersion polymers based on polyester polyurethanes, and would thereby seriously impair industrial use. The tertiary amines such as dimethylbenzylamine, diazabicycloundecene or other tertiary amines used as polyurethane catalysts, which are likewise proposed in that document for accelerating the heat-activated cross-linking reaction, are likewise unsuitable for use according to the invention because they do not prevent the liberation of TDI (q.v. Table 7, Comparison Examples 12b-16b).

A catalyst utilisable according to the invention is selected in accordance with the following criteria: for as long as the preparation is present as an aqueous dispersion mixture, no effect should be brought about by the catalyst addition, and so, for example, the catalyst should not influence disadvantageously the stability of the deactivated solid isocyanate dispersed in the aqueous medium. In the light of this, readily water-soluble salts which are dissociated in aqueous solution are particularly highly suitable because in this form they are not able to diffuse into the dispersed solid isocyanate particles.

After the removal of the aqueous phase by drying, however, the catalyst should deploy its action in the polymer film when monomeric isocyanate is separated out from the deactivated solid isocyanate by thermal cleavage of the oligomeric isocyanate during the course of the bonding process or when the finished component produced with the preparation is used. At this temperature, which brings about separation of isocyanate monomer, the catalyst must be able to accelerate the reaction between the isocyanate monomer which has formed and groups present in the matrix which are potentially reactive with isocyanates, in a way that no significant quantities of the isocyanate monomer will be gassing out. These isocyanate-reactive groups which originate in the polymer or additives may be OH groups, NH groups (from amine, urethane or urea structures) or also the uretdione structure.

At the same time, however, at this temperature the catalyst must not, or must only to a subordinate degree, accelerate the cleavage of the oligomeric solid isocyanate, in order for the renewed formation of volatile monomeric isocyanate at all costs to proceed more slowly than the formed volatile monomeric isocyanate is eliminated by its reaction with isocyanate-reactive groups present in the layer or by oligomerisation to the thermally stable isocyanurate structure, which is optionally likewise possible. It is thus possible to suppress to a large extent the liberation of volatile monomeric isocyanate, which, but for the utilisation of suitable catalysts, is virtually unavoidable under the influence of heat during the processing of the preparations or during use of bonded joints or coatings produced with the preparations, owing to the thermal lability of the oligomeric isocyanates.

The isocyanate-reactive polymer dispersions used are the known aqueous dispersions of homo- and copolymers of olefinically unsaturated monomers and polyurethane dispersions. The oligomeric solid isocyanates are, for example, dimers of aromatic or aliphatic isocyanates, in particular of TDI or IPDI. These can be deactivated in the preparation by mono- or polyamines having primary and/or secondary amino groups, as described, for example, in EP-A 0 467 168. The mono- or polyamines used for the deactivation may also, as described in DE-A 10 140 206, carry ionic groups, for example carboxylate or in particular sulfonate groups. The latter preparations are distinguished by elevated shear resistance and yield highly uniform, smooth layers after drying.

Catalysts which are suitable according to the invention are, for example, basic trimerisation catalysts from the series of compounds known from the literature (q.v. Methoden der Organischen Chemie [Organic Chemistry Methods], Houben-Weyl, Vol. E 20, Chapter 14 D. Dieterich: Polyisocyanurate [Polyisocyanurates], p. 1739 et seq. and the further literature references quoted therein), which are selected in accordance with the criteria above, optionally by means of simple preliminary testing on the actual one-component latently reactive system.

According to the invention, for example, salts corresponding to the formula $X^+Y^-$ may be used, in which, independently of one another, X stands for alkali metal or tetraalkylammonium and Y denotes hydroxyl or stands for phenolate or the anions of saturated or unsaturated carboxylic acids having 1-18 C atoms.

With these catalysts the preparations according to the invention yield films or coatings from which, even when heated to 90 to 100° C., escape of the monomeric isocyanate as a cleavage product of the oligomeric polyisocyanate which is used virtually no longer occurs, or is minimal.

By contrast, amidines or Mannich bases, examples of tertiary amines as trimerisation catalysts (q.v. Methoden der Organischen Chemie [Organic Chemistry Methods], Houben-Weyl, Vol. E 20, Chapter 14 D. Dieterich: Polyisocyanurate [Polyisocyanurates], p. 1739 et seq.) are virtually without effect according to the invention.

The largely quantitative suppression of monomeric isocyanate escape from the (adhesive) layer is extremely impor tant, with regard to safety in use and processing of such preparations. This problem is solved by the use according to the invention of catalysts in these preparations.

Catalysts which are highly effective according to the invention are alkali metal carboxylates, alkali metal phenolates or basic quaternary ammonium compounds. In addition to the remaining constituents, the preparations according to the invention comprise these catalysts at concentrations of from 0.05-1.5 wt. %, preferably within the range 0.1-0.7 wt. %, and particularly preferably within the range 0.2-0.5 wt. %, with reference to the total adhesive preparation. In the polymer film, for example the adhesive layer, they bring about a rapid reaction between monomeric isocyanate which has formed and isocyanate-reactive groups such as, for example, OH, NH, SH groups, and other isocyanate groups or uretdiones, with formation of derivatives such as urethanes, allophanates, biurets, isocyanurates and the like. Catalysts which accelerate the reaction of the liberated isocyanate monomers, as described above, more strongly than further monomeric isocyanate is liberated by the cleavage of the oligomeric solid isocyanates are in any case utilisable according to the invention. As a result, at the temperatures which occur during the course of processing and/or use, free monomer having isocyanate groups, for example TDI, is overall reacted more rapidly in the layer than it forms in the layer as a result of cleavage of the uretdione group in the TDI dimer.

Catalysts which are suitable according to the invention are, for example, alkali metal carboxylates, alkali metal phenolates, or basic quaternary ammonium compounds. Basic salts corresponding to the formula $$X^+Y^-,$$

in which

X+ denotes alkali metal cation, for example lithium cation, sodium cation, potassium cation or tetraalkylammonium cation $(NR^1R^2R^3R^4)^+$ and Y⁻ denotes OH anion, phenolate anion or carboxylate anion, are preferred.

X+ preferably stands for Li+, Na+, K+, as well as $R^1$ to $R^4$ in $(NR^1R^2R^3R^4)^+$ being, independently of one another, preferably aliphatic, optionally substituent-carrying saturated or unsaturated alkyl radicals having 1 to 18 C atoms (for example methyl, ethyl, 2-hydroxyethyl, propyl, 2-hydroxypropyl, butyl, nonyl, dodecyl, oleyl, benzyl).

Y⁻ preferably stands for OH⁻, as well as for the anions of saturated and unsaturated carboxylic acids having 1 to 18 C atoms, such as, for example, ethanoic, propionic, benzoic, maleic, 2-ethylhexanoic or oleic acid.

Table 1 shows the composition of the preparations according to the invention. In addition to the catalysts which are determining for the invention, they comprise isocyanate-cross-linkable polymer dispersions, solid isocyanate dimer, deactivating amine, emulsifiers, protective colloids and further auxiliary substances. The isocyanate-reactive polymer dispersions content is around 20-99 wt. % of the preparation, the deactivated solid isocyanates content is around 0.1-5 wt. %, the auxiliary substances and additives content is around 0-80 wt. %, and the catalyst content according to the invention is around 0.05-1.5 wt. %

TABLE 1

Composition of the preparations according to the invention

| Constituents of preparations according to the invention | Function | Quantity wt. % |
|---|---|---|
| Oligomeric solid isocyanate | Cross-linking agent | 0.1-5 |
| Deactivating amine | Stabilises the isocyanate oligomer | * |
| Emulsifiers/protective colloids | Stabilises the shear and coagulation resistance of the dispersion | as required |
| Isocyanate-reactive polymer dispersion | Adhesive polymer | 20-99 |
| Catalyst according to the invention | Accelerates the reaction of the monomeric isocyanate liberated from the isocyanate oligomer | 0.1-1.5 |
| Auxiliary substances | Plasticisers, fillers, antioxidants, antimicrobial agents, antifoams, etc. | 0-80 |
| Thickener | Stabilises the preparations against sedimentation by elevated viscosity | as required |

*: in accordance with the quantity of the isocyanate dimer present, 0.5 to 30 mol. % amine groups, calculated on the total isocyanate groups.

The known isocyanate-reactive aqueous dispersions of homo- and copolymers of olefinically unsaturated monomers and polyurethane dispersions are suitable for the preparations according to the invention. Preferred polymer dispersions are isocyanate-reactive polyurethane or polyurea dispersions as well as polymers of 2-chlorobutadiene.

Suitable polymers of olefinically unsaturated monomers are described in, for example, EP-A 0 206 059. They are, for example, homo- and copolymers based on vinyl esters of carboxylic acids having 2 to 18 C atoms, preferably having 2 to 4 C atoms, such as, for example, vinyl acetate. These can optionally be utilised with up to 70 wt. %, with reference to the total quantity, of other olefinically unsaturated monomers and/or homo- or copolymers of (meth)acrylic acid esters of alcohols having 1 to 18 C atoms, preferably having 1 to 4 C atoms, such as, for example (meth)acrylic acid esters, methyl esters, ethyl esters, propyl esters, hydroxyethyl esters or hydroxypropyl esters. Isocyanate-reactive functions arise as a result of copolymerisation of OH— or NH-functional monomers such as, for example hydroxyethyl or hydroxypropyl (meth)acrylate, butanediol monoacrylate, ethoxylated or propoxylated(meth)acrylates, N-methylol acrylamide, tert.-butylaminoethyl methacrylate or (meth)acrylic acid. Glycidyl methacrylate and allylglycidyl ether can also be copolymerised. The subsequent reaction of the epoxy groups with amines or aminoalcohols then leads to secondary amino groups.

Aqueous dispersions of polymers and copolymers of 2-chlorobuta-1,3-diene, optionally with other olefinically unsaturated monomers of the type named above by way of example, are likewise suitable. These dispersions have, for example, a chlorine content of from 30 to 40 wt. %, preferably a chlorine content of 36 wt. %. The reactivity of the polymers of 2-chlorobutadiene, which are a priori non-isocyanate-reactive, results from replacement of hydrolysable Cl groups by OH groups, or in accordance with EP-A 0 857 741 (examples of polychloroprene dispersions having differing degrees of hydrolysis, Table 1, page 5 with CR dispersions 1 to 4), which proceeds during the course of the production process.

Suitable aqueous polyurethane dispersions are those such as are described in the prior art, for example in U.S. Pat. No. 3,479,310, U.S. Pat. No. 4,092,286, DE-A 2 651 505, U.S. Pat. No. 4,190,566, DE-A 2 732 131 or DE-A 2 811 148.

Dispersions of isocyanate-reactive polyurethanes, which are constructed of crystallised polymer chains which when measured by means of thermomechanical analysis decrystallise at least partially at temperatures of <110° C., preferably at temperatures of <90° C. and particularly preferably at temperatures of <60° C., are particularly preferred. The preparations according to the invention are utilised in particular for the production of coatings or bonded joints which, after drying and brief heat activation during the production of the bonded joint, cross-link over the course of a few days without further additional supply of heat. Their softening point and resistance to water and solvents are markedly improved. In order to produce such bonded joints the adhesive application that has been dried on the substrate which is to be bonded is decrystallised by brief heating, preferably of less than 60 seconds' duration, to T>60° C. and joined in the decrystallised state.

For this purpose the adhesive application can also be dried on a substrate and then pressed with a foil material which has been softened to plasticity by heating, such that in contact with the film adhesive the foil acquires a temperature above the decrystallisation temperature of the polymer in the film adhesive. A further preferred form of using the preparations is the production of latently reactive heat-activatable pre-coatings, films or powders, which are storable at temperatures below the decrystallisation temperature of the polymer and which cross-link when heated above this limit.

The solid oligomeric isocyanates preferably have melting or softening points of >30°. Dimerisation products of TDI or IPDI are preferred. The solid isocyanates content of the preparations, calculated on the polymer content, lies within the range 0.1 to 10 wt. %, preferably within the range 0.5 to 5 wt. %. The range 0.5 to 3.5 wt. % is particularly preferred. They are—appropriately before mixing with the polymer dispersions—ground and dispersed with the action of high shear forces, for example with the use of a pearl mill, in an aqueous solution or dispersion of the deactivating amines, to an average particle diameter of <100 µm, preferably <15 µm.

In order to "deactivate", "retard" or "stabilise" (depending on the literature reference one or more of these terms are used synonymously) the dispersed solid isocyanate in the aqueous dispersion preparation, the isocyanate groups which are exposed at the surface of the solid isocyanate particles are reacted with deactivating amines. For this purpose longer-chain polyether amines, such as are described in EP-A 0 922 720, for example Jeffamine® D 400 or Jeffamine® T 403 (Huntsman Corp., Utah, USA) can be utilised. Mono-, di- and polyamines, which have anionic groups such as carboxylate or sulfonate groups as a molecular structure constituent in accordance with DE-A 10 140 206, are particularly preferred. The deactivating amines are utilised in a quantity such that there are from 0.5 to 30 mol. %, preferably 3 to 15 mol. %, amine groups per 100 mol. % of the isocyanate groups present in the solid isocyanate. In this circumstance the isocyanate groups which are accessible in the particle surface react with the deactivating amine. As a result of the very high reactivity of this aliphatic amine vis-à-vis isocyanate groups, by contrast with water, a polyurea layer is formed virtually exclusively with this "deactivating amine" on the surface of the dispersed isocyanate particles. For as long as sufficient quantities of amine are contained in the system, the isocyanate is largely withdrawn from the water reaction. If a small proportion of the NCO groups nevertheless reacts with water, the resulting $CO_2$ is reabsorbed by the stabilising amine.

The preparations can also comprise as additives further hydroxy- or amino-functional low-to-high molecular weight compounds, which can likewise react with the oligomeric solid isocyanates and with the monomeric isocyanates which optionally arise therefrom by thermal cleavage. In particular in the case of dispersions of polymers having a low isocyanate-reactive-group content, the co-use of such functional additives can support the reduction according to the invention of the monomeric isocyanates which are liberated. However, since, in terms of the isocyanate reaction, these compounds are in competition with the polymers which are to be cross-linked, account must optionally be taken of their isocyanate-consumption in order to prevent an inadequate cross-linking of the adhesive polymer.

Low molecular weight compounds are understood to be those having molecular weights of between 60 and 500 g/mol, and high molecular weight compounds to be those whereof the molecular weights are between 500 and 10000 g/mol. Examples are ethanolamine, diethanolamine, ethanediol, butanediol, glycerol, pentaerythritol, as well as terminally ethoxylated polypropylene glycols, polyvinyl alcohols or polyamines.

The preparations may also comprise as further auxiliary substances and additives such substances having no isocyanate-reactive groups, furthermore wetting agents, emulsifiers, thickeners, protective colloids and optionally stabilisers, anti-oxidants, fillers, coloured pigments, plasticisers, non-solvent liquids and further auxiliary agents.

The following substances are utilised in the Examples:

Isocyanate-Reactive Polymer Dispersion

Dispercoll® U 53, polyurethane dispersion from Bayer MaterialScience AG, 51368 Leverkusen; solids content approx. 40 wt. %; isocyanate-reactive polymer of linear polyurethane chains based on an adipic acid/butanediol polyester having HDI/IPDI as isocyanate component. After the dispersion is dried and the film is cooled to 23° C. the polymer crystallises. Measurement using thermomechanical analysis shows the film to be largely crystallised at temperatures of <+65° C.

Oligomeric Solid-Isocyanate

Dimer of toluylene 2,4-diisocyanate: Metalink® U from Acima AG; CH 9471 Buchs, Switzerland.

Deactivating Amines:

Example series a: Jeffamine® T 403; trifunctional polyether amine, MW=approx. 450, manufactured by Huntsman Corp., Utah, USA. Example series b: sodium salt of 2-(2-aminoethylamino)ethanesulfonic acid; ionically modified stabilising amine; Bayer MaterialScience AG, 51368 Leverkusen.

Auxiliary Substances:

Antifoam; manufacturer: Münzig, Chemie GmbH, D-74076 Heilbronn Necal® BX

Emulsifier; manufacturer: BASF AG, D-67056 Ludwigshafen Tamol® NN 4501 (45% in water)

Protective colloid; manufacturer: BASF AG, 67056 Ludwigshafen Borchigel® L 75

Thickener; manufacturer: Borchers GmbH, D-40765 Monheim Walocel® MT 4000PV

Thickener; manufacturer: Wolff Cellulosics GmbH & Co. KG, 29656 Walsrode

Catalysts Utilised in the Examples According to the Invention:

| Example No. | Catalyst |
|---|---|
| 1, 2 | sodium acetate |
| 3 | potassium acetate |
| 4, 5 | sodium propionate |

-continued

| Example No. | Catalyst |
|---|---|
| 6 | sodium oleate |
| 7, 8 | tetrabutylammonium hydroxide |
| 9 | tetramethylammonium acetate |
| 10, 11 | trimethyl-2-hydroxypropylammonium-2-ethylhexanoate |

Catalysts Utilised in the Comparison Examples

These compounds are indicated in the literature (Methoden der Organischen Chemie [Organic Chemistry Methods], Houben-Weyl, Vol. E 20, Chapter 14; D. Dieterich Polyisocyanuirate [Polyisocyanurates], p. 1739 et seq. and in the further literature references cited therein as effective trimerisation catalysts). They are unsuitable for achieving the object on which the invention is based because they obviously fail to lead to a sufficiently rapid reduction in the detectable quantity of TDI monomer which outgases from the adhesive layer at elevated temperature.

| Comparison Example No. | Catalyst |
|---|---|
| 12, 13 | amidine: (DBU) 1,8-diazabicyclo[5.4.0]undec-7-ene |
| 14, 15, 16 | Mannich base of phenol: 2,4,6-tris-(N,N-dimethylaminomethyl) phenol |
| 17 | non-basic quaternary ammonium salt: tetrabutylammonium bromide |

Production of the Preparations:

The preparations are produced in two steps (I and II) as follows:

(I) Production of the deactivated dispersion of the TDI dimer in water

Table 2 shows the basic formulations a and b of the deactivated isocyanate dispersions for deactivating the amines a and b

TABLE 2

Basic formulations a and b of the deactivated isocyanate dispersions for deactivating amines a and b (all quantities are expressed as parts by weight)

| | | Basic formulation | |
|---|---|---|---|
| Function | Substance | a | b |
| Dispersing medium | Water | 500 | 536 |
| Deactivating amine a | Jeffamine ® T-403 | 25 | — |
| Deactivating amine b | Sodium salt of 2-(2-aminoethylamino) ethanesulfonic acid (40% aqueous solution) | — | 59 |
| Oligomeric solid isocyanate | Metalink ® U (TDI dimer) | 410 | 395 |
| Antifoam | Agitan ® 281 | 1 | — |
| Protective colloid | Tamol ® NN 4501 (45% in water) | 10 | — |
| Detergent | Nekal ® BX (salt-free) | 4 | — |
| Thickener | Walocel ® MT 4000PV | 50 | 10 |
| Total | | 1000 | 1000 |

In the first step the solid Metalink® U (TDI dimer) is dispersed in water in accordance with the basic formulations a) or b) shown in Table 2, with use of suitable grinding and dispersing devices in the presence of the deactivating amine (Jeffamine® T 403 [test series a] or the sodium salt of 2-(2-aminoethylamino)ethanesulfonic acid [test series b]. Equipment suitable for the finely particulate dispersing are, for example, dissolvers, rotor-stator-type dispersing equipment, ball mills or pearl mills, with the temperature not being permitted to rise above 40° C. A TORUSMILL® from VMA-Getzmann GmbH (D-51580 Reichshof, Germany) was used in order to carry out the examples. The pre-dispersion and the grinding operation are carried out in the same vigorously cooled double-walled special steel vessel. First a mixture of water, antifoam, optionally protective colloid, optionally detergent and deactivating amine is produced into which the TDI dimer is finally stirred. The grinding compartment of the pearl mill is then inserted, which is filled to 70% volume with zirconium oxide spheres (1.2-1.7 mm diameter). During the grinding operation the grinding compartment is cooled intensively so that the temperature in the dispersion remains below 30° C. The grinding operation lasts for approximately 60 minutes and yields an average particle size of approx. 10 µm, having a maximum at 20 µm.

Simultaneously with the grinding, the TDI dimer particles are deactivated by surface reaction with the amines a or b which are present. Lastly, the viscosity of the suspension is increased to approx. 5000 mPas by the addition of the thickener solution, in order to avoid sedimentation. Both basic formulations comprise the cross-linking agent TDI dimer at approximately the same concentration of 40 wt. %.

(II) Producing the adhesive preparations comprising the catalysts, with use of the basic formulations a or b produced in the first step 100 parts by weight of the polymer dispersion—Dispercoll® U 53—are introduced into a stainless steel or glass vessel of an appropriate size. With stirring, using a dissolver (Dispermat), 5 parts by weight of the deactivated TDI dimer suspensions as well as additionally respectively one of the catalysts listed in the Tables which follow are then added in the quantities indicated: Table 3 for Examples according to the invention and Table 4 for examples not according to the invention. Since the deactivated suspensions of the Metalink® U (TDI dimer) comprise approx. 40 wt. % of solid isocyanate, this quantity corresponds to approx. 2.0 parts by weight of solid isocyanate to 100 parts of polymer dispersion. The mixtures are stirred at 1000 r.p.m. for 5 minutes to homogenise. Finally, sufficient thickener is dispensed into them for the finished preparations to have a viscosity of the order of approximately 2500 mPas (approx. 2 wt. %—with reference to the total mixture—of the solution of Borchigel L 75).

TABLE 3

Examples according to the invention

| | | | Parts/wt |
|---|---|---|---|
| Components of the adhesive preparations | Preparation | | |
| | A | b | |
| Dispercoll ® U 53 | — | — | 100 |
| Basic formulation of deactivated Metalink ® U dispersion in water | Deactivation: Jeffamine ® T 403 | Deactivation: 2-(2-aminoethylamino) ethanesulfonic acid, Na salt | 5 |
| Borchigel ® L | — | — | approx. 2 |

TABLE 3-continued

Examples according to the invention

| 75 solution Catalysts according to the invention: | Example Nos. | | Parts/wt |
|---|---|---|---|
| Sodium acetate | | 1b | 0.1 |
| Sodium acetate | | 2b | 0.2 |
| Potassium acetate | | 3b | 0.2 |
| Sodium propionate | | 4b | 0.1 |
| Sodium propionate | | 5b | 0.2 |
| Sodium oleate | | 6b | 0.2 |
| Tetrabutyl-ammonium hydroxide | | 7b | 0.1 |
| Tetrabutyl-ammonium hydroxide | 8a | 8b | 0.2 |
| Tetramethyl-ammonium acetate | | 9b | 0.2 |
| Trimethyl-2-hydroxypropyl-ammonium 2-ethylhexanoate | | 10b | 0.2 |
| Trimethyl-2-hydroxypropyl-ammonium 2-ethylhexanoate | 11a | 11b | 0.4 |

TABLE 4

Comparison Examples

| Components of the adhesive preparations | Preparation | | Parts/wt |
|---|---|---|---|
| | A | b | |
| Dispercoll ® U 53 | | | 100 |
| Basic formulation of deactivated Metalink ® U (TDI dimer) dispersion in water | Deactivation: Jeffamine ® T 403 | Deactivation: 2-(2-amino-ethylamino) ethanesulfonic acid Na salt | 5 |
| Borchigel ® L 75 solution | | | approx. 2 |
| Catalysts: | Example Nos. | | |
| Amidine: (DBU) 1,8-diaza-bicyclo[5.4.0]undec-7-ene | — | 12b | 1.1 |
| Amidine: (DBU) 1,8-diaza-bicyclo[5.4.0]undec-7-ene | — | 13b | 1.7 |
| Mannich base of phenol: 2,4,6-tris-N,N-dimethyl-aminomethyl) phenol | — | 14b | 0.5 |
| Mannich base of phenol: 2,4,6-tris-N,N-dimethyl-aminomethyl) phenol | — | 15b | 0.9 |

TABLE 4-continued

Comparison Examples

| | | | Parts/wt |
|---|---|---|---|
| Mannich base of phenol: 2,4,6-tris-N,N-dimethyl-aminomethyl) phenol | — | 16b | 1.8 |
| Non-basic catalyst: tetrabutylammonium bromide | — | 17b | 0.1 |

Discussion of Results

In Table 5 the definition of the prior art relating to the TDI monomer separation (thermodesorption for 30 min at 90° C., followed by analysis of volatile components (GC measurement)) from dry film adhesives of preparations without catalyst is set out. The preparations show a variation in the proportion of TDI dimer (in the form of the suspension having the basic formulation b, as produced in accordance with Table 2). As the proportion of Metalink® U (TDI dimer) decreases, the quantity of separated monomeric TDI decreases. However, because cross-linking is likewise reduced as the TDI dimer quantity drops, in measurements of the softening point (the measure of heat resistance for the shoe industry) on substrates containing plasticisers or oil (soft PVC or NORA rubber), satisfactory values for the softening point of bonding in heat are not achieved, provided that the quantity of separated monomeric TDI is <10 ppm.

TABLE 5

TDI separation from dry film adhesives of the preparation b (q.v. Table 3 or 4) without catalyst

| Metalink ® U (TDI dimer) basic formulation to 100 parts Dispercoll ® U 53 Parts by weight | TDI monomer determination by GC (ppm) | Softening point [° C.] | | |
|---|---|---|---|---|
| | | PVC 30% DOP | Nora | KASX |
| 10 | 1700 | 107 | 138 | 146 |
| 7 | 1200 | 105 | 129 | 141 |
| 5 | 570 | 96 | 120 | 133 |
| 4 | 200 | 88 | 117 | 132 |
| 3 | 15 | 77 | 94 | 119 |
| 2 | 7 | 68 | 83 | 109 |

The polymer dispersion (Dispercoll® U 53) used in these preparations has a 40% solids content, as also has the basic formulation b of the dispersed TDI dimer.

Process for the Selection of Suitable Catalysts:

Separation of volatile monomeric TDI from the preparations considered here which are based on polymer dispersions and deactivated Metalink® U (TDI dimer) can be avoided with the use according to the invention of suitable basic catalysts. The suitable catalyst is selected against the background that it must accelerate the reaction between the isocyanate group of liberated isocyanate monomer (TDI) and isocyanate-reactive groups, including the uretdione group itself, more strongly than the cleavage of the dimeric isocyanate (uretdione) to form the monomer (TDI). The thermal lability of isocyanate dimers is known (product data sheet for Metalink® U; Acima AG, CH-9471 Buchs) to be intensified by many catalysts, such that the monomeric isocyanate liberation temperature could, if the catalyst were selected incorrectly, be further reduced or the rate of cleavage of the oligomer be increased.

Basic alkali metal salts (Examples 1b-6b; Results: Table 6) even at low concentrations demonstrate an excellent effectiveness in terms of the very low quantity of volatile TDI monomer achieved with their aid. It is important to utilise the salts at the lowest possible concentration in the adhesive preparations in order to avoid negative effects on the Theological stability (shear resistance and coagulation resistance) of the preparations produced with polymer dispersions.

Basic tetraalkylammonium compounds (Examples 7b-11b; Results: Table 6) are likewise highly effective catalysts according to the invention. The importance of the basicity of the catalyst for effectiveness according to the invention in the. preparation is demonstrated by the contrast between tetrabutylammonium bromide (Example 17b; Results: Table 7), which brings about no substantial reduction in the quantity of TDI liberated, and the basic tetramethylammonium acetate which at the same low concentration suppresses the liberation of monomeric TDI very effectively (Example 9b; Results: Table 6).

TABLE 6

The influence on the TDI liberation of the type and quantity of catalyst according to the invention

| Example No. | Catalyst | Concentration in preparation [wt. %] | TDI from film adhesive (TDS/GC, 30 min 90° C.) [ppm] |
|---|---|---|---|
| Prior art Preparation a and b | None | — | 470-670 |
| 1b | Sodium acetate | 0.1 | 40-100 |
| 2b | Sodium acetate | 0.2 | <10 |
| 3b | Potassium acetate | 0.2 | <10 |
| 4b | Sodium propionate | 0.1 | 11-24 |
| 5b | Sodium propionate | 0.2 | 15 |
| 6b | Sodium oleate | 0.2 | 48 |
| 7b | Tetrabutylammonium hydroxide | 0.1 | 190 |
| 8a | Tetrabutylammonium hydroxide | 0.2 | 30 |
| 8b | Tetrabutylammonium hydroxide | 0.2 | 30 |
| 9b | Tetramethylammonium acetate | 0.2 | <10 |
| 10b | Trimethyl-2-hydroxypropylammonium 2-ethylhexanoate | 0.2 | 30-70 |
| 11a | Trimethyl-2-hydroxypropylammonium 2-ethylhexanoate | 0.4 | <10 |
| 11b | Trimethyl-2-hydroxypropylammonium 2-ethylhexanoate | 0.4 | <10 |

TABLE 7

Comparison Examples having unsuitable catalysts

| Comparison Example No. | Catalyst | Concentration in preparation [wt. %] | TDI from dry film adhesive at 90° C. [ppm] |
|---|---|---|---|
| Prior art | None | — | 470-670 |
| 12b: amidine | DBU | 1.1 | 620 |
| 13b: amidine | DBU | 1.7 | 510 |
| 14b: Mannich base | 2,4,6-tris-(N,N-dimethylaminomethyl) phenol | 0.5 | 490 |
| 15b: Mannich base | 2,4,6-tris-(N,N-dimethylaminomethyl) phenol | 0.9 | 470 |
| 16b: Mannich base | 2,4,6-tris-(N,N-dimethylaminomethyl) phenol | 1.8 | 410 |
| 17b: non-basic salt | Tetrabutylammonium bromide | 0.1 | 220 |

DBU: 1.3-diazabicyclo[5.4.0]undecene

Measurement of TDI Monomer Separation

In order to determine the TDI liberation from the dried film adhesives (approx. 170 μm) samples of the film adhesives were introduced into the TDS system from Gerstel GmbH & Co KG (Aktienstrasse 232-234, 45473 Mülheim) and conditioned at 90° C. under a dry gas current for 30 min. The constituents which were volatile under these conditions were first collected in a cold trap (−150° C.) and, following completed thermodesorption, were analysed using a GC Agilent® 6890N (Agilent Technologies Deutschland GmbH, Hewlett-Packard Str 8, D-76337 Waldbronn).

Method:

| Thermodesorption: | |
|---|---|
| Initial temperature | 20° C. |
| Heating rate | 60° C./min |
| Holding temperature | 90° C. |
| Holding time | 30 min |
| Cold feed system parameters | |
| Initial temperature | −150° C. |
| Heating rate | 12° C./sec |
| Holding temperature | 280° C. |
| Holding time | 3 min |
| GC parameters: | |
| Initial temperature | 50° C. |
| Initial time | 2 min |
| $1^{st}$ heating rate | 25° C./min |
| Holding temperature | 160° C. |
| Holding time | 0 min |
| $2^{nd}$ heating rate | 10° C./min |
| Holding temperature | 300° C. |
| Column | DB-5 MS |
| Detector | FID |

Production of Samples for Softening Point Determination:

The test specimens of KASX (nitrile rubber), Nora rubber (SBR) and soft PVC (30% DOP), respectively, are roughened with abrasive paper (grade 80) immediately before application of the adhesive. The adhesive formulation is applied by brush to both sides of the 20×10 mm adherend surface. The adhesive layer is dried at 23° C./50% relative humidity for 60 min.

Heat Activation:

The adherend surfaces are irradiated with an IR radiation source (from Funk; shock activator 2000), and the film adhesive is heated, dependent on the substrate, to a surface temperature of approx. 85° C. (PVC with 30% DOP), approx. 109° C. (SBR) and approx. 158° C. (nitrile rubber), respectively. The decrystallisation temperature of the polymer chain of the polyurethane dispersion used (Dispercoll® U 53) is within the range 50-65° C. Bonding takes place immediately after heat activation of the adhesive-coated test specimens, by laying the activated adhesive layers one against the other and pressing at 4 bar for one minute in a press. The test specimens thus produced are stored at 23° C. and 50% relative humidity for 7 days.

Heat Testing (Softening Point Determination):

The test specimens are placed under a 4 kg load and conditioned to 40° C. in a heating chamber within 30 min. The test specimens are then heated to 150° C. at a linear heating rate of 0.5° C./min. The softening point, that is to say the temperature in ° C. at which the bonded joint fails under the 4 kg load, is recorded. In each case 5 separate measurements are taken.

For comparison: without cross-linking, bonded joints with use of Dispercoll® U 53 have a softening point of approx. 60° C. under these conditions. The softening point after isocyanate cross-linking when Dispercoll® U 53 is used as the adhesive polymer is within the range 90-150° C., depending on the substrate (q.v. in this context Table 5).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous preparations comprising
   a) dispersed polymers having isocyanate-reactive groups,
   b) dispersed surface-deactivated oligomeric solid polyisocyanates, and
   c) at least one catalyst,
   wherein the catalyst or the totality of catalysts are compounds corresponding to the formula $X^+Y^-$, in which, independently of one another
   X represents alkali metal or tetraalkylammonium, and
   Y represents hydroxyl or phenolate or the anions of saturated or unsaturated carboxylic acids having 1-18 C atoms, and the catalyst accelerates the reaction of the monomeric polyisocyanates which form by the thermal cleavage of the oligomeric polyisocyanates more strongly than the thermal cleavage itself.

2. The preparations according to claim 1, wherein alkali metal carboxylates, alkali metal phenolates and/or basic quaternary ammonium compounds are used as catalyst.

3. The preparations according to claim 1, wherein the preparations comprise from 0.05 to 1.5 wt.% catalyst, with reference to the total preparation.

4. The preparations according to claim 1, wherein the preparations comprise from 0.1 to 0.7 wt.% catalyst, with reference to the total preparation.

5. The preparations according to claim 1, wherein the preparations comprise from 0.2 to 0.5 wt.% catalyst, with reference to the total preparation.

6. The preparations according to claim 1, wherein independently of one another,
   X denotes lithium, sodium or potassium or tetraalkylammonium corresponding to the formula $(NR^1R^2R^3R^4)^{3\oplus}$, wherein $R^1$ to $R^{4,}$ independently of one another, denote saturated or unsaturated alkyl radicals having 1-18 C atoms, and
   Y denotes hydroxyl or stands for phenolate or the anions of saturated or unsaturated carboxylic acids having 1-18 C atoms.

7. The preparations according to claim 1, wherein independently of one another,
   X denotes lithium, sodium or potassium or tetraalkylammonium corresponding to the formula $(NR^1R^2R^3R^4)^{3\oplus}$, wherein $R^1$ to $R^{4,}$ independently of one another, stand for methyl, ethyl, 2-hydroxyethyl, propyl, 2-hydroxypropyl, butyl, nonyl, dodecyl, oleyl or benzyl, and
   Y denotes hydroxyl or stands for phenolate or the anions of ethanoic, propionic, benzoic, maleic, 2-ethylhexanoic or oleic acid.

8. The preparations according to claim 1, wherein mono- and/or polyamines are used for the surface deactivation of the oligomeric solid polyisocyanates.

9. The preparations according to claim 1, wherein mono- and/or polyamines are used which carry ionic groups as a molecular structure constituent for the surface deactivation of the oligomeric solid polyisocyanates.

10. The preparations according to claim 9, wherein the polyamines which carry ionic groups as a molecular structure constituent are aminosulfonates corresponding to the formula

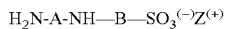

wherein A and B, independently of one another, stand for hydrocarbon segments having 2 to 6 carbon atoms and Z stands for an alkali metal atom or tetraalkylammonium corresponding to the formula $(NR^1R^2R^3R^4)^+$, wherein $R^1$ to $R^4$, independently of one another, represent methyl, ethyl, 2-hydroxyethyl, propyl, 2-hydroxypropyl, butyl, nonyl, dodecyl, oleyl or benzyl.

11. The preparations according to claim 10, wherein the amine sulfonate is a salt of 2-(-2-aminoethylamino) ethanesulfonic acid.

12. The preparations according to claim 10, wherein the amine sulfonate is a salt of taurine (2-aminoethanesulfonic acid).

13. The preparations according to claim 1, wherein dimerisation products of TDI or IPDI are used as oligomeric solid polyisocyanates.

14. The preparations according to claim 1, wherein polyurethanes are used as isocyanate-reactive polymers.

15. The preparations according to claim 1, wherein polymers and copolymers of 2-chlorobutadiene are used as isocyanate-reactive polymers.

16. A process for the production of preparations according to claim 1, comprising mixing aqueous dispersions of at least one isocyanate-reactive polymer with at least one dispersed surface-deactivated oligomeric solid polyisocyanate and at least one catalyst which accelerates the reaction of the monomeric polyisocyanates which form by the thermal cleavage of the oligomeric polyisocyanates more strongly than the thermal cleavage itself.

17. Binders, bonded joints, or coatings comprising the preparations according to claim 1 and one or more additives selected from the group consisting of wetting agents, emulsifiers, thickeners, protective colloids, stabilisers, antioxidants, fillers, coloured pigments, plasticisers, non-solvent liquids, and combinations thereof.

18. A method of making a latently cross-linking adhesive layer comprising applying the binders, bonded joints, or coatings according to claim 17 to a substrate.

19. Substrates coated with layers obtainable with preparations according to claim 1.

* * * * *